US010081427B2

(12) United States Patent
Van Loon

(10) Patent No.: US 10,081,427 B2
(45) Date of Patent: Sep. 25, 2018

(54) GALLEY CONTAINER FOR AN AIRCRAFT AND METHOD FOR MANUFACTURING SUCH A GALLEY CONTAINER

(71) Applicant: Zodiac Aircatering Equipment Europe B.V., Alkmaar (NL)

(72) Inventor: Laurentius Petrus Joseph Van Loon, Slootdorp (NL)

(73) Assignee: Zodiac Aircatering Equipment Europe B.V., Alkmaar (NL)

( * ) Notice: Subject to any disclaimer, the term of this patent is extended or adjusted under 35 U.S.C. 154(b) by 957 days.

(21) Appl. No.: 14/388,433

(22) PCT Filed: Mar. 25, 2013

(86) PCT No.: PCT/NL2013/050218
§ 371 (c)(1),
(2) Date: Sep. 26, 2014

(87) PCT Pub. No.: WO2013/147594
PCT Pub. Date: Oct. 3, 2013

(65) Prior Publication Data
US 2015/0122807 A1 May 7, 2015

(30) Foreign Application Priority Data

Mar. 27, 2012 (NL) .................................. 2008550

(51) Int. Cl.
*B62B 3/06* (2006.01)
*B64D 11/00* (2006.01)
(Continued)

(52) U.S. Cl.
CPC .......... *B64D 11/0007* (2013.01); *B29C 53/60* (2013.01); *B29C 63/08* (2013.01);
(Continued)

(58) Field of Classification Search
CPC ... B29C 65/483; B29C 65/524; B29C 65/562; B64D 151/0007; B62B 3/06
(Continued)

(56) References Cited

U.S. PATENT DOCUMENTS

2010/0266820 A1* 10/2010 Goodworth ............... B64C 1/20
428/192
2011/0278879 A1* 11/2011 Belanger .................. B29C 70/86
296/187.01

FOREIGN PATENT DOCUMENTS

CN 1238040 A 12/1999
CN 102267483 A 12/2012
(Continued)

OTHER PUBLICATIONS

"Processing Technologies of Composites", Jia Lijun et al., pp. 157-161, Tianjin University Press, Sep. 2007.
(Continued)

*Primary Examiner* — King M Chu
(74) *Attorney, Agent, or Firm* — NLO N.V.; Catherine A. Shultz; Lindsey A. Auerbach

(57) ABSTRACT

A Galley container (1) for use in an aircraft, includes at least two container sidewalls (6), a container floor element (7) and a container ceiling element (8), forming a hollow inner shell casing (2) with a circumferential first rim (12) and a circumferential second rim (12'). The composite tape (11) is spun around the inner shell casing and along the circumference of the rims, forming at least part of a construction layer (5) of the galley container. The composite tape includes at least one fiber and a matrix material.

20 Claims, 4 Drawing Sheets

(51) Int. Cl.
  *B64D 11/04*   (2006.01)
  *B29C 53/60*   (2006.01)
  *B29C 63/08*   (2006.01)
  *B32B 37/02*   (2006.01)
  *B32B 37/14*   (2006.01)

(52) U.S. Cl.
  CPC ............ *B32B 37/02* (2013.01); *B32B 37/142* (2013.01); *B64D 11/04* (2013.01); *B32B 2307/304* (2013.01); *B32B 2439/40* (2013.01); *Y02T 50/46* (2013.01)

(58) Field of Classification Search
  USPC ........................................................ 220/630
  See application file for complete search history.

(56) References Cited

FOREIGN PATENT DOCUMENTS

| | | |
|---|---|---|
| GB | 2 479 640 A | 10/2011 |
| GB | 2 480 370 A | 11/2011 |
| WO | WO-98/12496 | 3/1998 |

OTHER PUBLICATIONS

Translation of Office Action issued in Chinese counterpart application.

International Search Report, dated May 6, 2013, from corresponding PCT application.

\* cited by examiner

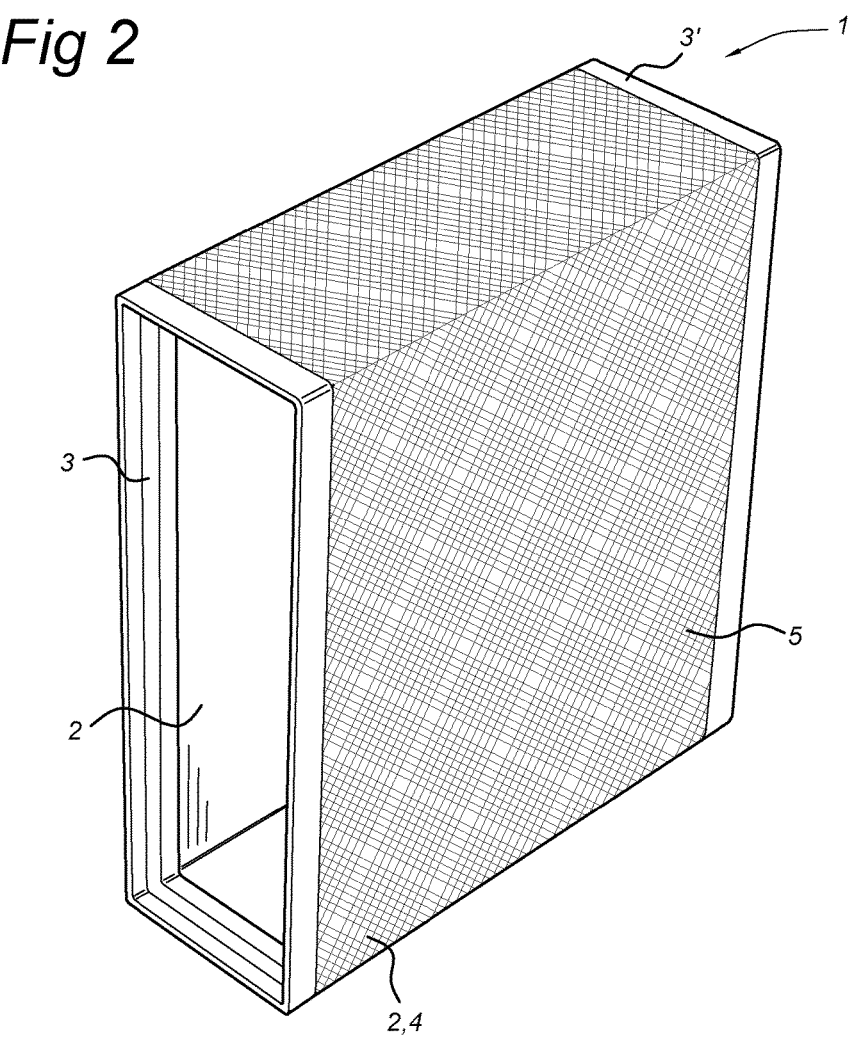

GALLEY CONTAINER FOR AN AIRCRAFT AND METHOD FOR MANUFACTURING SUCH A GALLEY CONTAINER

FIELD OF THE INVENTION

The invention relates to a galley container for an aircraft, for example a galley cart. In addition, the invention relates to a method for manufacturing such a galley container.

DESCRIPTION OF THE RELATED ART

Galley containers are commonly used in the transport industry to perform different tasks. They must store and/or carry goods and can be configured to serve drinks, food, sell goods and collect garbage, among other tasks. Originally, galley containers are provided with an aluminum body that is rather heavy. Galley containers made of composite materials are becoming more attractive because of their light weight although they sometimes increase the level of manufacturing complexity.

Composite material galley containers are known from GB2479640, which describes the use of galley containers comprising an upper portion, a right lateral wall portion, a left lateral wall portion and the bottom wall portion connected together in a continuous wall to form a body. Radius portions can be used to interconnect the adjacent wall portions. The four planar wall portions can be produced separately and can be later assembled in a unitary body.

For safety reasons, a galley container has to have high mechanical strength and must remain intact upon high impacts, such an aircraft crash. The contents of the galley container must remain inside the container upon a crash as well. These requirements demand high impact resistance and a hard shell casing for a galley container. Conventional galley containers are manufactured from light-weight metals, such as aluminum, to reduce weight, but maintain sufficient strength. Still, conventional aluminum galley containers are rather heavy through the relatively thick aluminum plates used. Composite materials are known for their high strength to weight ratio, such that these materials are highly favourable for use in products that require high strength and low weight.

Assembling a galley container using distinct wall portions as described in GB2479640 has the disadvantage that the connections between the composite wall portions will usually not be as strong as the wall portions themselves. In addition, the assembly of distinct composite wall portions increases the manufacturing complexity.

It would therefore be desirable to provide an alternative galley container construction that alleviated at least some of the perceived inconveniences of the prior art.

BRIEF SUMMARY OF THE INVENTION

According to the invention there is provided a galley container for use in an aircraft, comprising at least two container sidewalls, a container floor element and a container ceiling element, forming a hollow inner shell casing with a circumferential first rim and a circumferential second rim, whereby a composite tape is spun around the inner shell casing along the circumference of the rims, forming at least part of a construction layer of the galley container, whereby the composite tape comprises at least one fibre and a matrix material.

The hollow inner shell casing of a galley container functions as a mandrel around which the composite tape is wound, such that the inner shell casing is reinforced by at least one additional construction layer. This construction layer can be made by spinning a composite tape around the inner shell casing along the circumference of the rims, forming a winding pattern.

The construction layer can be made at an inside or an outside of the inner shell casing of the galley container. However, in order to reinforce the inner shell casing, the construction layer is preferably spun on the outside surface of the inner shell casing.

According to another aspect, the composite tape is spun across the inner shell casing in a direction having an angle equal to or larger than 0° and smaller than or equal to 90° with the axial axis of the inner shell casing, whereby the direction is parallel to the surface of the inner shell casing.

The angle between the axial axis and the spanning direction of the composite tape can be adjusted such that the forces exerted on the container can be collected optimally along the composite tape, thereby increasing the strength of the construction layer.

According to a further aspect, the composite tape is wound around the inner shell casing in a direction substantially parallel to the first and second rim circumferences, forming at least part of the construction layer.

According to an aspect, the composite tape is spun back and forth between the first rim and the second rim and along the circumference of the rims. The construction layer can be made by spanning a composite tape back and forth between the first rim and the second rim across the inner shell casing, forming a winding pattern.

The direction of the composite tape in the back and forth direction can have different angles with the axial axis, as long as the directions are parallel to the surface of the inner shell casing. The preferred angles of the composite tape with the axial axis depend on the desired and/or required resulting strength, i.e. loading or impact strength, of the construction layer. Examples of winding angles can be 25° to 65°, more particular ranges of 25° to 35°, 40° to 50° and/or 55° to 65°, including regularly used angles of about 30°, about 45° and/or about 60°.

The winding pattern can be in a non-sinusoidal wavelike manner. The winding pattern can be in the shape of a square wave or a zigzag wave. The square wave comprises two sides that are parallel to a longitudinal axial axis of the inner shell casing and two sides that are perpendicular to the axial axis of the inner shell casing. The zigzag wave can be a sawtooth zigzag, whereby one side of the zigzag is longer than the other side of the zigzag, an isosceles zigzag, whereby both sides of the zigzag between each pair of peaks or valleys, i.e. the turning points at the rims, have equal length, an equilateral zigzag, whereby both sides of the zigzag between each pair of peaks or valleys have equal length and the base of the zigzag has the same length. The base of the zigzag is the line that can be drawn between two peaks or two valleys of the zigzag, forming a triangle with both sides of the zigzag. Zigzags that are a combination of the ones mentioned are possible as well.

By using a zigzag shape for spanning the composite tape, tensile and/or compressive forces in different directions, for example excerted on a galley container during a crash, can be collected by the composite tape, thereby strengthening the construction of the galley container.

The composite tape comprises at least one fibre and a matrix material. It is therefore possible to span the composite tape with only one fibre embedded in the matrix material, but alternatively, a number fibres can be embedded in the matrix material to form a bandlike tape of one or more layers of fibre-reinforced matrix material. The fibres can also be braided to form a braided composite tape or woven to form a textilelike composite tape. The fibres can be continuous fibers (or filaments) with a high aspect ratio, i.e. their lengths being several times greater than their effective diameters. The matrix material is preferably a material suitable for use in filament winding.

In a further embodiment, the composite tape is spun in a diagonal direction relative to an axial axis of the inner shell casing across the inner shell casing from the first rim to the second rim and along the circumference of the rims. The axial axis of the inner shell casing is an axis of symmetry that extends through the hollow inner shell casing from the plane defined by the first rim to the plane defined by the second rim.

In order to be able to collect and distribute impact and/or loading forces along perpendicular directions that are parallel to the surface of the inner shell casing, diagonally spun composite tapes, relative to the axial axis of the inner shell casing, is preferred, as a diagonal fibre can collect both forces in the direction of the axial axis and a direction that is perpendicular to the axial axis but parallel to the surface of the inner shell casing.

In an embodiment, the composite tape engages connecting means, such as hooks, provided along the circumference of the first and second rims.

The composite tape can be connected to the rims of the hollow inner shell casing by using connecting means, such as hooks, protrusions and the like. When hooks are used, the at least one fibre of the composite tape engages the hook at the turning points of the winding pattern. The protrusions can be shaped such that the fibres of the composite tape can be wound around or engage with the protrusions at a turning point of the winding pattern.

In an alternative embodiment, the composite tape connects to the first and second rims through a weld. The matrix material of the composite tape is then welded to the hollow inner shell casing at or near a turning point. A requirement to use welding is that both the frame and the matrix material of the composite tape are made of the same kind of weldable material, such as a thermoplast. For welding it is not necessary that the matrix material and the frame comprise the exact same material, such that different thermoplasts can be used. Other connecting means such as described above are no longer necessary then.

According to another aspect, the container comprises a first frame provided along the first rim and a second frame provided along the second rim, whereby the first frame and the second frame are mutually connected by the composite tape.

The first and second rims of the inner shell casing may be profiled to form frames along the circumference of the inner shell casing. The profiles may comprise flanges that extend from the rim in an outward direction, or a groove extending in an inward direction into the inner shell casing. The profiles may also include elevations along the circumference of the rims. The frames can also be provided separately to be attached to the rims at a later stage, for example to connect the different elements of the inner shell casing to each other.

The first and second frames can be used to install closing means, such as doors or hatches, in the container. The frames can be directly attached to the rims of the inner shell casing, but in some cases other construction means can be provided in between.

The frames can be connected by the composite tape, such that the composite tape and the inner shell casing form different construction layers of the container.

In order to simplify the connection between the frames and the composite tape, the connecting means described above are provided along the circumference of the first and second frames. It is also possible to connect the composite tape to the first and second frames through a weld, thereby forming a connection between the frames.

According to an embodiment, a further composite tape comprising at least one fibre and a matrix material, is wound around the inner shell casing in a direction substantially parallel to the first and second rim circumferences forming a further construction layer of the galley container.

In order to reinforce the galley container, a further composite tape is wound around the inner shell casing. The direction of winding is substantially parallel to the first and second rims or first and second frames, meaning that with every winding around the complete circumference of the inner shell casing, a further winding is positioned adjacent or at least partly overlapping the previous winding until a further construction layer covering at least part of the inner shell casing is obtained. The windings can therefore not be exactly parallel to the rims or frames and may have a slight offset, i.e. pitch. The winding adjacent the first rim or frame and the winding adjacent the second rim or frame can be parallel to the respective rim or frames in order to obtain a further construction layer covering the shell casing from rim to rim or from frame to frame.

It is possible to only use one construction layer, either spun back and forth, zigzaglike, diagonally or substantially parallel to the rims and/or frames with a pitch. In addition, the substantially parallel wound construction layer can be constructed by winding a composite tape having a width comparable with a width of the inner shell case, defined as the shortest distance between the front and back rims, or front and back frames. The composite tape is then wound in one winding to cover the circumferential surface of the inner shell casing or layer, in that case without a pitch.

According to another aspect, at least one other layer of material, such as a thermally insulating layer, is provided between the inner shell casing and at least one of the construction layers. The layer of material functions as a barrier between the inner shell casing and at least one of the construction layers, which can be beneficial upon impact. A thermally insulating layer can make the galley container suitable for storage of cooled or heated products. Alternatively, the layer of material functions as a filler layer between the inner shell casing and the composite tape construction layers.

According to another embodiment, the first frame and second frame are clamped between the tightly wound further composite tape, whereby the further construction layer forms a connection means between the frames.

As an alternative connection between the frames of the galley container, the frames can be clamped between the tightly wound composite tape windings of the further construction layer. In this case, connection means along the frame can be omitted or can be simplified relative to hooks or protrusions, such as a groove or recess to engage the composite tape.

According to an embodiment, the composite tapes comprise at least one of glass, carbon and aramide fibre, respectively. Other possibilities are the less commonly used metal fibres, such as boron-tungsten fibres and silicon carbide coated fibres, or ceramic fibres, such as quartz, silica or alumina fibres.

Carbon and aramide fibre are known to have high tensile strength and are used widely for composites for high impact resistance. The composite tape of the back and forth spun construction layer and the composite tape of the further construction layer do not necessarily have to comprise the same fibre.

The matrix material of the composite tapes can comprise a thermoplastic matrix material, such as one of polyetherimide (PEI), polyether ether ketone (PEEK). For aerospace applications high-performance thermoplastics are usually used, but commodity plastics can be used as well. Other examples of possible thermoplastics can be polyphenylsulfone (PPSF or PPSU) or polysulfone (PSU).

The use of a thermoplastic resin in a composite has the advantage that the resin can be shaped when heated above the glass transition temperature. In addition, processing can be relatively fast since only heating, shaping and cooling are involved. Furthermore, thermoplasts are easier to repair when damage is observed. It can also be used to weld the composite tape to the inner shell casing or the frames, as described above.

The matrix material of the composite tapes can comprise a thermosetting resin, such as polyester, polyimide, phenolic polyamide or epoxy.

The use of a thermosetting resin in a composite has the advantage that after winding the composite tape and upon curing, the construction layers have taken their final shape. Another advantage is that thermosetting resins are generally stronger than thermoplastic resins due to a three dimensional network of bonds (cross-linking) upon curing, and are also better suited to high-temperature applications up to the decomposition temperature, such as in case of fire aboard the aircraft.

Preferably, the fibres of the composite tapes are stretched under a tensile stress of 1-135 N, preferably 5-50 N.

By stretching the composite tape, i.e. the fibres are stretched, the composite tape can be spun across the inner shell casing in a taut manner. Without the composite tape being taut, the forces exerted on the construction layer could not be received and distributed by the fibres of the composite tape.

The invention further relates to a method of manufacturing a galley container for an aircraft, comprising:
  providing a hollow inner shell casing with a circumferential first rim and a circumferential second rim, the inner shell casing comprising at least two container sidewalls, a container floor element and a container ceiling element;
  spanning a composite tape around the inner shell casing, whereby the composite tape comprises at least one fibre and a matrix material, thereby forming at least part of a construction layer of the spun composite tape.

The hollow inner shell casing of a galley container may not have the required strength and impact resistance by itself, such that the inner shell casing may need to be reinforced by at least one further construction layer. This construction layer can be made by spanning a composite tape around the inner shell casing.

According to a further embodiment, spanning the composite tape around the inner shell casing comprises spanning the composite tape across the inner shell casing in a direction having an angle between 0° and 90° with the axial axis of the inner shell casing. The angle between the axial axis and the spanning direction of the composite tape can be adjusted such that the forces of impact can be collected optimally along the composite tape, thereby increasing the impact resistance. The direction of the composite fibre between the first and second rim and the direction of the composite tape between the second rim and first rim can have different angles with the axial axis, as long as the directions are parallel to the surface of the inner shell casing.

According to an aspect of the method, winding the composite tape around the inner shell casing comprises spanning the composite tape across the inner shell casing back and forth from the first rim to the second rim, thereby forming at least part of the construction layer of the spun composite tape. The composite tape is repeatingly connected and spun along the circumference of the rims.

According to a further aspect of the method, the composite tape is wound around the inner shell casing in a direction substantially parallel to the first and second rim circumferences.

Furthermore, the composite tape can be spun across the inner shell casing in a square wavelike manner.

In addition, the composite tape can be spun across the inner shell in a zigzag manner.

The composite tape is spun across the inner shell casing along the circumference of the rims repeatedly to form at least part of a construction layer of the composite tape. The back and forth winding pattern can comprise a non-sinusoidal wavelike pattern and can be a zigzag wavelike pattern or a square wavelike pattern.

According to a still further embodiment, spanning the composite tape in a direction at an angle with the axial axis of the inner shell casing comprises spanning the composite tape in a diagonal direction relative to a axial axis (A) of the inner casing across the inner shell casing from the first rim to the second rim. A zigzag or diagonal fibre can collect both forces in the direction of the axial axis and a direction that is perpendicular to the axial axis but parallel to the surface of the inner shell casing.

By using a zigzag shape for spanning the composite tape, tensile and/or compressive forces in different directions, for example excerted on a galley container during a crash, can be collected by the composite tape, thereby strengthening the construction of the galley container.

Preferably, the method comprises connecting the composite tape to at least one of the first and second rim of the inner shell casing. The composite tape can be connected to the first and second rim in several ways. According to an embodiment, the method comprises engaging the composite tape with connecting means, such as hooks, provided along the circumference of the first and second rims. Alternatively, the method comprises connecting the composite tape to the first and second rims through a weld. In the above described connections, the composite tape can be connected to the first and second rims adjacent or at the turning points of the winding pattern, such as the peaks and valleys of the zigzag or the corners of a square wave.

Preferably, the method comprises providing a first frame along the first rim and a second frame along the second rim.

The first and second frames are provided such that closing means, such as doors or hatches, can be installed in the container. The frames can be directly attached to the rims of the inner shell casing, but in some cases other construction means can be provided in between.

According to an aspect, the method comprises:
  connecting the composite tape to the first frame;
  spanning the composite tape back and forth from the first frame to the second frame across the inner shell casing, thereby mutually connecting the first frame and the second frame by the composite tape.

The frames can be connected by the composite tape, such that the composite tape and the inner shell casing form different construction layers of the container.

In order to simplify the connection between the frames and the composite tape, the connecting means described above are provided along the circumference of the first and second frames. It is also possible to connect the composite tape to the first and second frames through a weld, thereby forming a connection between the frames.

According to an embodiment, the method comprises winding a further composite tape comprising at least one fibre and a matrix material around the inner shell casing in a direction substantially parallel to the first and second frame circumferences, thereby forming a further construction layer of the galley container.

The direction of winding is substantially parallel to the first and second rims or first and second frames, meaning that with every winding around the complete circumference of the inner shell casing, a further winding is positioned adjacent or partly overlapping the previous winding until a further construction layer covering at least part of the inner shell casing is obtained. The windings can therefore not be exactly parallel to the rims or frames and may have a slight offset, i.e. pitch. The winding adjacent the first rim or frame and the winding adjacent the second rim or frame can be parallel to the respective rim or frames in order to obtain a covering further construction layer. Such windings can also be performed back and forth between the frames and/or rims to form a multiple layered further construction layer. In addition, the further construction layer can comprise winding patterns as described above.

The method further comprises providing between the inner shell casing and at least one of the construction layers at least one layer of material, such as a thermally insulating layer. The layer of material functions as a barrier between the inner shell casing and at least one of the construction layers, which can be beneficial upon impact. A thermally insulating layer can make the galley container suitable for storage of cooled or heated products. Alternatively, the layer of material functions as a filler layer between the inner shell casing and the composite tape construction layers.

According to a further embodiment, the method comprises tightly winding the further composite tape, thereby connecting the first frame and second frame by clamping the frames between the tightly wound further composite tape. In this case, connection means along the frame can be omitted or can be simplified relative to hooks or protrusions, such as a groove or recess to engage the composite tape.

The method further comprises stretching the fibres of the composite tapes under a tensile stress of 1-135 N, preferably 5-50 N.

BRIEF DESCRIPTION OF THE DRAWINGS

The features and advantages of the invention will be appreciated upon reference to the following drawings of a number of exemplary embodiments, in which:

FIG. 2 shows a further embodiment of the galley container.

DESCRIPTION OF ILLUSTRATIVE EMBODIMENTS

Figure 1A:
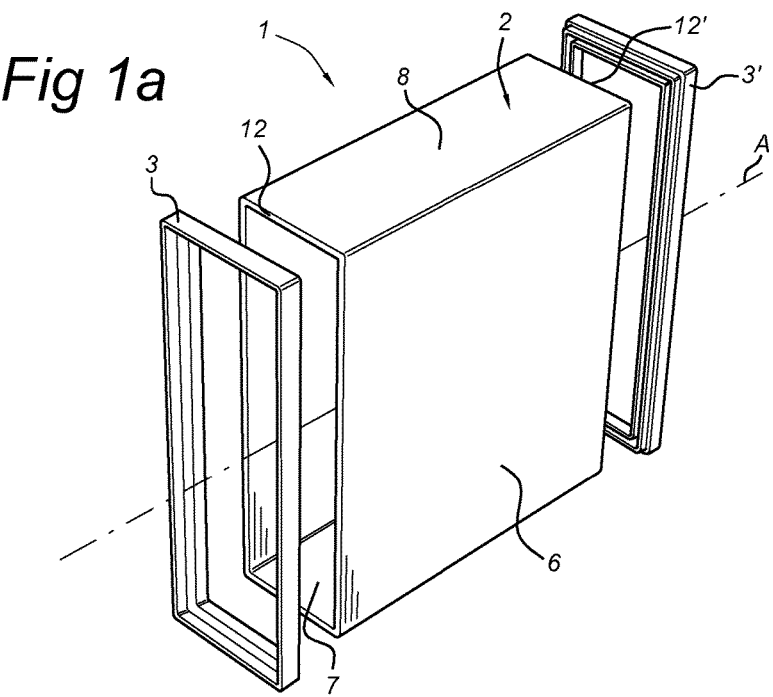
FIGS. 1a-f show an embodiment of a method for manufacturing an embodiment of a galley container.

FIG. 1a shows an embodiment of a galley container 1 comprising a hollow inner shell casing 2 with a front rim 12 and a back rim 12' and a longitudinal axial axis A. The inner shell casing 2 further comprises two sidewalls 6, a floor element 7 and a ceiling element 8. The inner shell casing can be constructed as an integral casing. The material used for the inner shell casing can be any material suitable for constructing such a casing, for example aluminum, composite material or a plastic, either a thermoplast or a thermoset.

Alternatively, the side walls 6, the floor element 7 and the ceiling element 8 can be manufactured separately and layer assembled to form a shell casing.

Along the circumference of the front rim 12 a frame 3 is provided, and along the circumference of the back rim 12' a frame 3' is provided. The frames 3, 3' can be provided with a profile along the circumference to engage the rims 12, 12'. The frames 3, 3' can function as a connection means between the elements forming the inner shell casing 2.

Figure 1B:
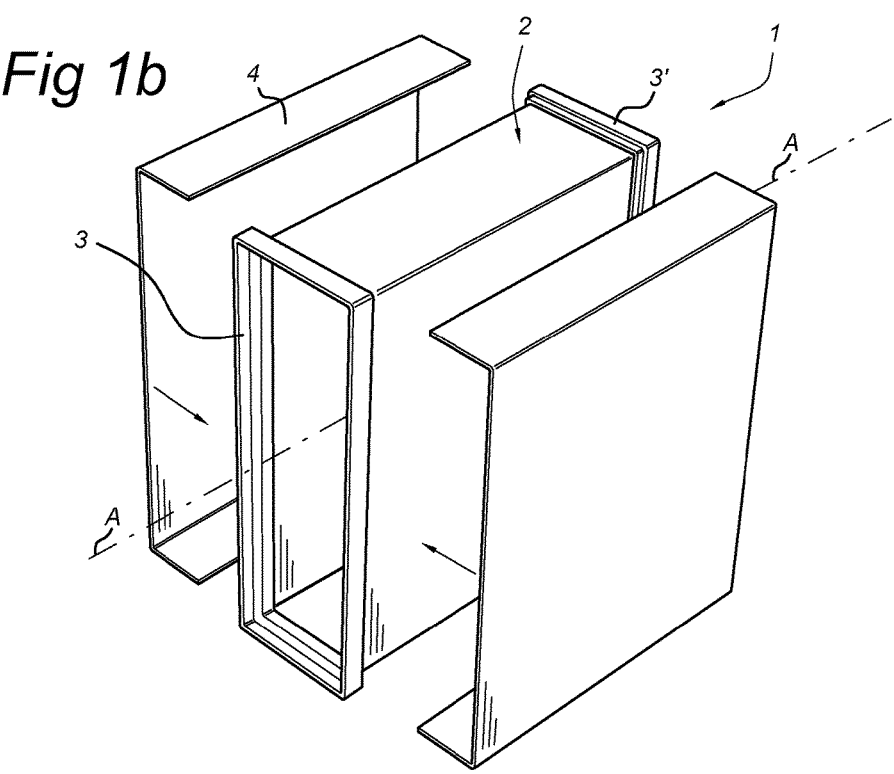
Figure 1C:
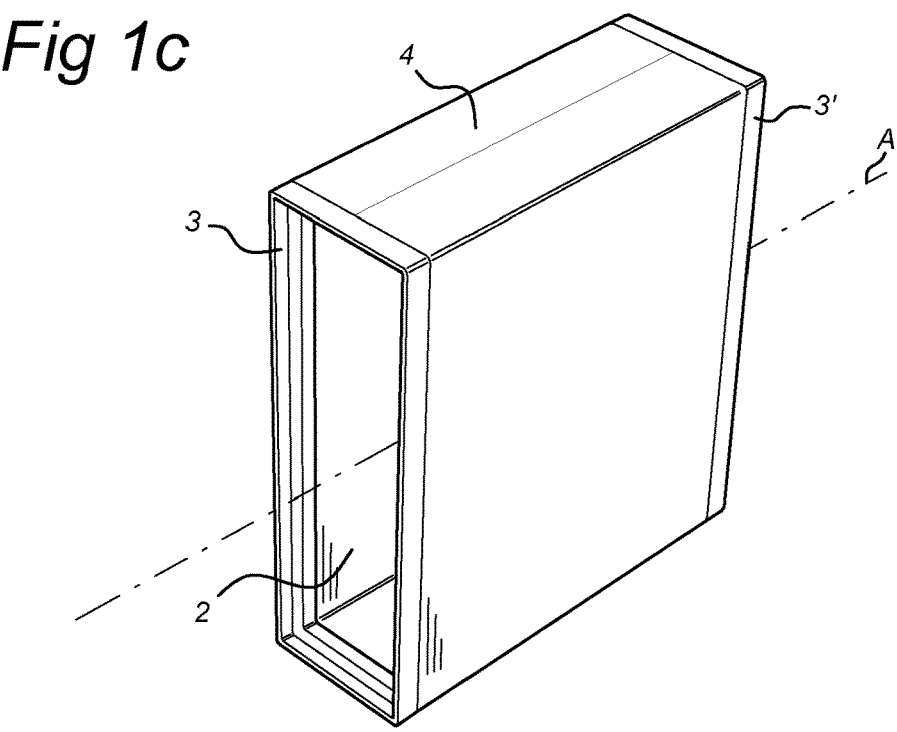

FIG. 1b shows the embodiment of the galley container 1 with the frames 3, 3' connected to the rims 12, 12'. The inner shell casing 2 can be provided with at least one layer of material 4, for example thermal insulating material, around the outside surface, as shown in FIG. 1c. The frames 3, 3' can be formed such that they can engage the layer 4, for example by a profile.

Figure 1D:
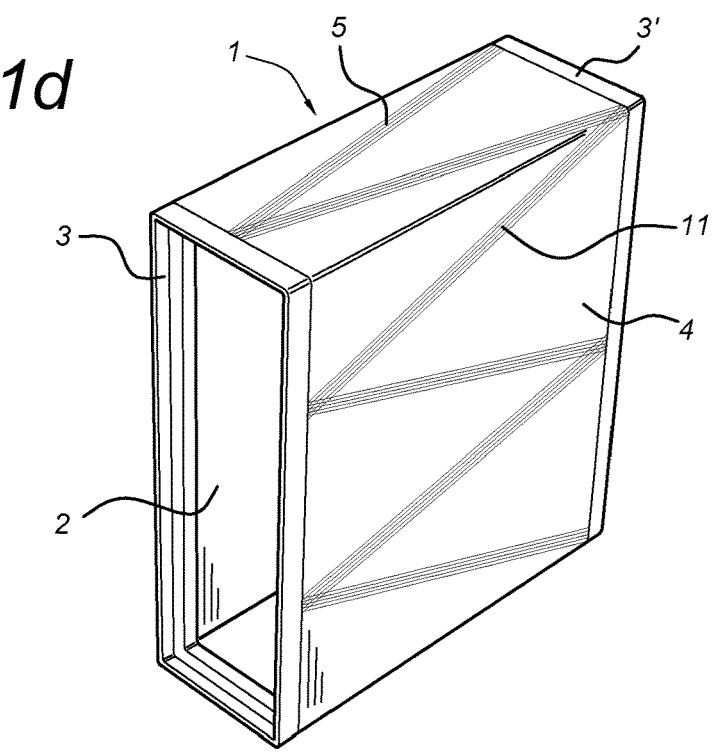

FIG. 1d shows a further embodiment of the galley container 1, where across the outside of the layer 4 and along the circumference of the frames a composite tape 11 is spun. The composite tape 11 comprises at least one fibre and a matrix material. The composite tape 11 shown in FIG. 1d comprises multiple fibres, preferably continuous fibres, i.e. filaments. The matrix material can be any material suitable for filament winding, preferably a resin, such as a thermoplastic or thermosetting resin.

The composite tape 11 shown in FIG. 1d is spun in a zigzag manner, where the zigzag forms an isosceles zigzag, whereby both sides of the zigzag between each pair of turning points, i.e. peaks or valleys of the zigzag, have equal length. The base of the zigzag is the line that can be drawn between two turning points at one of the frames, forming a triangle with both sides of the zigzag. The composite tape 5 is connected to the frames 3, 3' by connecting means or welds (not shown) at the turning points of the zigzag.

The composite tape 11 that is spun in zigzag manner forms a construction layer 5 that at least partly covers the outer surface of the layer 4 or the outer surface of the inner shell casing 2, when the layer 4 is omitted. A nearly complete coverage of the inner shell casing 2 or layer 4 by the zigzag like wound construction layer is shown in FIG. 2.

Figure 1E:
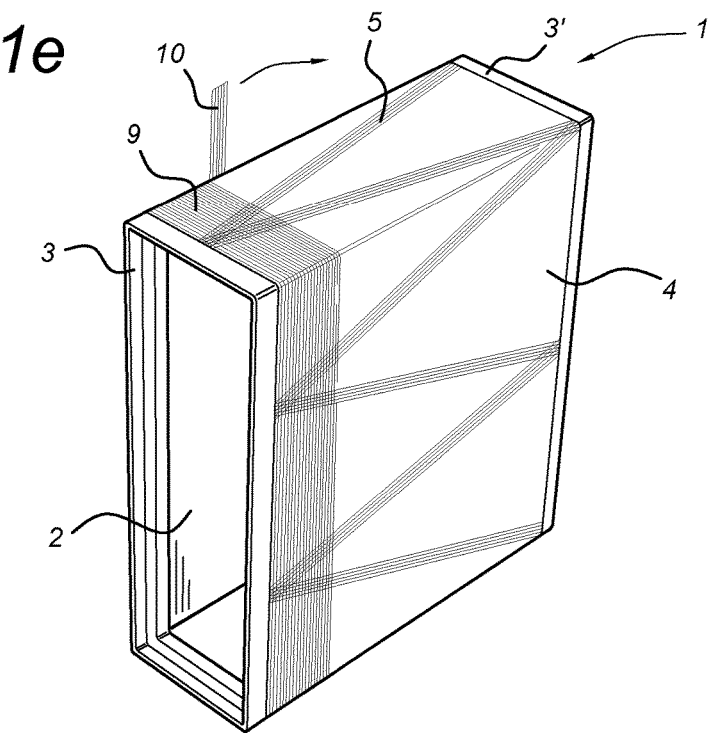

FIG. 1e shows a part of a further construction layer 9 that is spun by a further composite tape 10, which is wound around the inner shell casing 2 in a direction substantially parallel to the circumferences of the first and second rim 12, 12'. The winding can have a pitch with respect to the axial axis of the inner shell casing, such that a second winding of the composite tape is at least adjacent to a first winding of the composite tape. The first and second windings are preferably partly overlapping to form an integral further construction layer 9.

The further composite tape 10 comprises at least one fibre and a matrix material. Just as with the composite tape 5, the fibre of the further composite tape 10 preferably is a continuous fibre, i.e. a filament, and the matrix material is suitable for filament winding. In order to form a further construction layer that at least partly covers the inner shell casing 2 or the layer 4, the further composite tape 10 has to be spun in a direction that has a slight offset from the direction parallel to the rims 12, 12' of the inner shell casing.

Figure 1F:
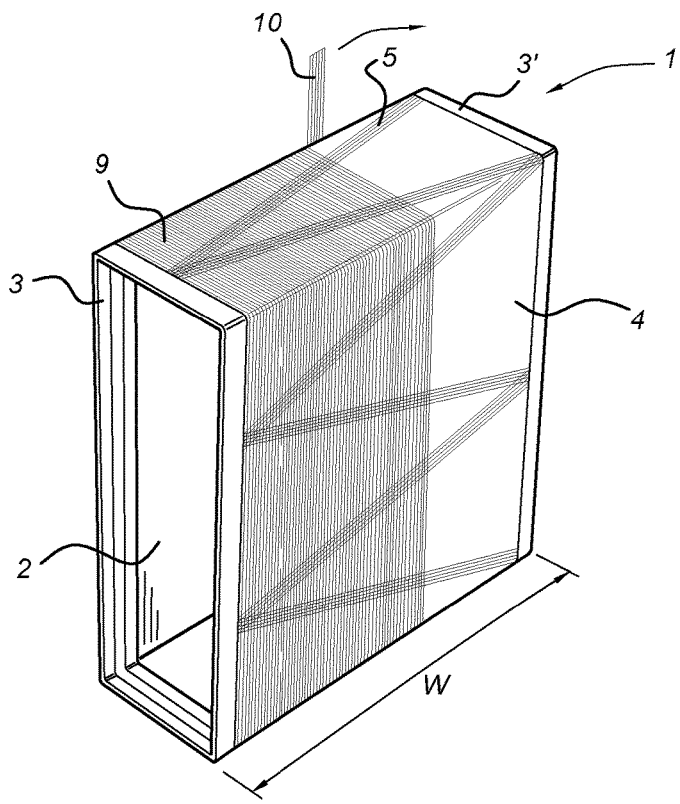

FIG. 1f shows the further construction layer 9 in a later stage of the manufacturing of the galley container 1. The further construction layer 9 shown in FIG. 1f has a surface that coincides with the surface of the frames 3, 3', such that these surfaces form part of the same plane. The further construction layer 9 can subsequently be covered by a finishing layer (not shown) to smoothen the outer surface of the galley container 1. The finishing layer can comprise polyvinylidene fluoride (PVDF), polyvinyl fluoride (PVF), or polyurethane (PU).

FIG. 2 shows a galley container with one construction layer 5 that is spun in a zigzag manner to cover the surface of the inner shell casing 2 or the layer 4. When this layer has a sufficient thickness to coincide with the surfaces of the frames 3, 3' to form part of the same plane, a further construction layer 10 might not be necessary. The construction layer 5 can be covered by a finishing layer (not shown) to smoothen the outer surface of the galley container 1, such that the zigzag winding pattern of the composite tape 11 is covered. It is also possible that the one construction layer is spun substantially parallel to the rims and/or frames with a pitch, as shown in FIGS. 1e and 1f. The construction layer can also be spun by a composite tape that has a width that is comparable to a width of the inner shell casing, defined by the shortest distance between the rims and/or frames, W.

FIG. 1a shows a first step of an embodiment of a method of manufacturing a galley container 1 for an aircraft. The method comprises providing a hollow inner shell casing 2 with a circumferential first rim 12, i.e. a front rim, and a circumferential second rim 12', i.e. a back rim, whereby the inner shell casing 2 comprises at least two container sidewalls 6, a container floor element 7 and a container ceiling element 8. In FIG. 1b the inner shell casing 2 is provided with at least one layer of material 4, such as a thermally insulating layer. As seen in FIG. 1d, the layer of material 4 can be provided between the inner shell casing 2 and a construction layer 5. In addition, a first frame 3, i.e. a front frame, is provided along the front rim 12 and a second frame 3', i.e. a back frame, is provided along the second rim 12'. The composite tape 11 is then connected to the front frame 3 and spun in a zigzag manner from the front frame 3 to the back frame 3' across the inner shell casing 2, thereby mutually connecting the front frame 3 and the back frame 3' by the composite tape 11, as is seen in FIG. 1d.

The composite tape comprises at least one fibre and a matrix material, suitable for winding fibres, more particular continuous fibres, i.e. filaments. The windings of the composite tape 11 form at least part of a construction layer 5 by repeatedly connecting and spanning the composite tape along the circumference of the frames 3, 3'.

In order to connect the composite tape to the frames, connecting means (not shown) are provided along the circumference of the front and back frames 3, 3'.

FIG. 1e shows the winding of a further composite tape 10 comprising at least one fibre and a matrix material around the inner shell casing 2 in a direction substantially parallel to the front and back frame circumferences, thereby forming a further construction layer 9 of the galley container 1.

LIST OF PARTS

1. Galley container
2. Inner shell casing
3+3'. Frames
4. Layer
5. Construction layer
6. Side wall
7. Floor element
8. Ceiling element
9. Further construction layer
10. Further composite tape
11. Composite tape
12+12'. Rims
A. Axial axis

The invention claimed is:

1. A galley container for use in an aircraft, comprising at least two container sidewalls, a container floor element and a container ceiling element, forming a hollow inner shell casing with a circumferential first rim and a circumferential second rim, whereby a composite tape is spun across the inner shell casing and along the circumference of the rims in a direction having an angle equal to or greater than 0° and smaller than or equal to 90° with an axial axis of the inner shell casing, whereby the direction is parallel to the surface of the inner shell casing, forming at least part of a construction layer of the galley container, whereby the composite tape comprises at least one fiber and a matrix material.

2. The galley container according to claim 1, wherein the composite tape is wound around the inner shell casing in a direction substantially parallel to the first and second rim circumferences.

3. The galley container according to claim 1, wherein the composite tape is spun back and forth between the first rim and the second rim across the inner shell casing and along the circumference of the rims.

4. The galley container according to claim 3, whereby the composite tape is spun in a diagonal direction relative to the axial axis of the inner shell casing across the inner shell casing.

5. The galley container according to claim 1, whereby the composite tape engages connecting means, such as hooks, provided along the circumference of the first and second rims.

6. The galley container according to claim 1, whereby the composite tape connects to the first and second rims through a weld.

7. The galley container according to claim 1, comprising a first frame provided along the first rim and a second frame provided along the second rim, whereby the first frame and the second frame are mutually connected by the composite tape, preferably wherein the connecting means are provided along the circumference of the first and second frames or wherein the composite tape connects to the first and second frames through a weld, thereby forming a connection between the frames.

8. The galley container according to claim 1, whereby a further composite tape comprising at least one fiber and a matrix material, is wound around the inner shell casing in a direction substantially parallel to the first and second rim circumferences forming a further construction layer of the galley container.

9. The galley container according to claim 1, whereby between the inner shell casing and at least one of the construction layers at least one other layer of material is provided, such as a thermally insulating layer.

10. The galley container according to claim 7, whereby the first frame and second frame are clamped between the tightly wound further composite tape, whereby the further construction layer forms a connection means between the frames.

11. The galley container according to claim 1, whereby the fibers of the composite tapes are stretched under a tensile stress of 1-135 N, preferably 5-50 N.

12. A method of manufacturing a galley container for an aircraft, comprising: providing a hollow inner shell casing with a circumferential first rim and a circumferential second rim, the inner shell casing comprising at least two container sidewalls, a container floor element and a container ceiling element;

spanning a composite tape across the inner shell casing and along the circumference of the rims in a direction having an angle equal to or greater than 0° and smaller than or equal to 90° with an axial axis of the inner shell casing, whereby the direction is parallel to the surface of the inner shell casing, whereby the composite tape comprises at least one fiber and a matrix material, thereby forming at least part of a construction layer of the spun composite tape.

13. The method according to claim 12, comprising providing a first frame along the first rim and a second frame along the second rim, and further comprising: connecting the composite tape to the first frame; spanning the composite tape back and forth between the first frame and the second frame across the inner shell casing, thereby mutually connecting the first frame and the second frame by the composite tape.

14. The method according to claim 12, comprising winding a further composite tape comprising at least one fiber and a matrix material around the inner shell casing in a direction substantially parallel to the first and second frame circumferences, thereby forming a further construction layer of the galley container.

15. The method according to claim 12, comprising providing between the inner shell casing and at least one of the construction layers at least one layer of material, such as a thermally insulating layer.

16. The method according to claim 12, comprising providing a first frame along the first rim and a second frame along the second rim, and further comprising: connecting the composite tape to the first frame; spanning the composite tape back and forth between the first frame and the second frame across the inner shell casing, thereby mutually connecting the first frame and the second frame by the composite tape.

17. A galley container for use in an aircraft, comprising at least two container sidewalls, a container floor element and a container ceiling element, forming a hollow inner shell casing with a circumferential first rim and a circumferential second rim, whereby a composite tape is spun across the inner shell casing and along the circumference of the rims, forming at least part of a construction layer of the galley container, whereby the composite tape comprises at least one fiber and a matrix material, wherein the galley container further comprises a first frame provided along the first rim and a second frame provided along the second rim, whereby the first frame and the second frame are mutually connected by the composite tape.

18. The galley container according to claim 17, wherein the composite tape connects to the first and second frames through a weld, thereby forming a connection between the frames.

19. The galley container according to claim 17, wherein a further composite tape comprising at least one fiber and a matrix material, is wound around the inner shell casing in a direction substantially parallel to the first and second rim circumferences, forming a further construction layer of the galley container.

20. The galley container according to claim 19, wherein the first frame and second frame are clamped between the tightly wound further composite tape, and wherein the further construction layer forms a connection means between the frames.

* * * * *